United States Patent Office 2,838,476
Patented June 10, 1958

2,838,476

MULTICOMPONENT INTERPOLYMERS OF VINYLIDENE CYANIDE AND MALEIC ANHYDRIDE

Hansjorg Heller, Akron, Ohio, assignor to The B. F. Goodrich Company, New York, N. Y., a corporation of New York No Drawing. Application August 3, 1955
Serial No. 526,335

9 Claims. (Cl. 260—78.5)

This invention relates to novel multicomponent polymers, methods for the preparation thereof and uses for the same. More particularly it pertains to interpolymers of vinylidene cyanide with another monomer, which, when polymerized alone with vinylidene cyanide, forms essentially a 1:1 alternating two-component copolymer with vinylidene cyanide and a third monomer which has strong electron withdrawing groups and contains an alpha,beta-disubstituted ethylene group in its molecular structure. Such interpolymers are extremely valuable synthetic resins, being especially useful in the preparation of synthetic filaments, films and the like which are easily dyed with acid-type dyes.

Monomeric vinylidene cyanide is a clear liquid at room temperature and a crystalline solid at 0° C. It melts in the range of 6.0° C. to 9.7° C., and it boils at 40° C. at a reduced pressure of 5 mm. of mercury. The monomer is quite sensitive to water, undergoing on contact therewith at room temperature an instantaneous homopolymerization reaction to give a solid, water-insoluble resin. Methods for the preparation of monomeric vinylidene cyanide are disclosed in U. S. Patents 2,476,270, 2,502,412 and 2,514,387.

In U. S. Patents 2,615,872 and 2,615,873 it is disclosed that monomeric vinylidene cyanide possessing the above properties polymerizes readily with aliphatic conjugated dienes to give hard, horny, resinous, non-rubbery. 1:1 alternating two-component copolymers, and in U. S. Patents 2,615,865 to 2,615,871 and 2,615,874 to 2,615,877 it is further disclosed that monomeric vinylidene cyanide polymerizes with other monoolefinic compounds to give 1:1 alternating two-component copolymers, all of which, in general, may be dissolved in solvents to give polymer solutions from which filaments and films are prepared which possess many useful properties including high tensile strength, and resistance to attack by chemicals, microorganisms, weather and the like. The disclosures of the above-mentioned patents are incorporated herein by reference. Such copolymers are unique in that they are essentially 1:1 alternating copolymers, that is, copolymers possessing the structure:

—M₁—M₂(M₁—M₂)ₓM₁—M₂— wherein each M₁ is a vinylidene cyanide unit

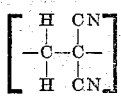

each M₂ is a unit of the second monomer and $x$ is a polydigit number. The fact that the copolymers thus obtained are essentially 1:1 alternating copolymers is determined by analysis of the copolymer which shows that the two monomers enter the polymer chain in essentially equimolar ratios regardless of the degree of monomer to polymer conversion and of charging ratio. Further supporting evidence for this fact is found in the copolymerization equation of F. M. Lewis, C. Walling et al., Journal of the American Chemical Society, volume 70, page 1519 (1948):

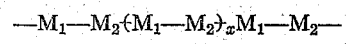

wherein $M_1$=concentration of unreacted monomer $M_1$
$M_2$=concentration of unreacted monomer $M_2$
$r_1$=ratio of the rate constants for the reaction of an $M_1$ type radical with $M_1$ and $M_2$ respectively
$r$=ratio of the rate constants for the reaction of an M type radical with $M_2$ and $M_1$ respectively When the product of $r_1$ and $r_2$ (the values of $r_1$ and $r_2$ being determined by solving the equation for $r_1$ and $r_2$) is equivalent to 0, a 1:1 alternating copolymer is formed, that is, a two-component copolymer having the

—M₁—M₂(M₁—M₂)ₓM₁—M₂— structure shown hereinabove.

However, while useful filaments, films and shaped articles can be prepared from two-component copolymers of vinylidene cyanide with monoolefinic compounds and aliphatic conjugated dienes, such copolymers are sometimes difficult to dissolve in ordinary solvents. Moreover, they may be very high melting materials and have a relatively short melt life, so that difficulty is encountered in fabricating such copolymers into filaments, films and shaped articles. Also, a few vinylidene cyanide two-component copolymers possess a high degree of crystallinity, a property which in itself is desirable in many applications, but which in applications such as injection molding is undesirable in that only opaque products can be obtained. Still another major difficulty which is often encountered with two component copolymers of vinylidene cyanide is that such copolymers are not easily dyed.

The resistance to dyes offered by vinylidene cyanide interpolymers is promoted by the smooth, slick finish of the fibers and films and the fact that very few points are available in the polymer chains for molecular attachment of the dyes. Acid dyes will react readily with basic groups such as amine, —NH₂, but it has been found impossible to polymerize basic groups into vinylidene cyanide polymer chains for, as described in U. S. Patent No. 2,589,274, the presence of even minute amounts of water or basic hydroxyl ion causes this monomer to homopolymerize to a low molecular weight, cross-linked, virtually useless resin.

Accordingly, it is an object of the present invention to modify the properties obtained in vinylidene cyanide two-component copolymers so that the resulting materials may be easily fabricated into filaments, films and shaped articles.

Another object of this invention is to provide interpolymers containing vinylidene cyanide, a second monomer selected from the group consisting of polymerizable monoolefins and conjugated aliphatic dienes, and a third monomer selected from the group defined as disubstituted ethylenes which have strong electron withdrawing groups substituted therein.

A further object of this invention is to provide interpolymers of vinylidene cyanide which can be readily solvent spun, cast, or molded.

Still another object of this invention is to provide interpolymers containing vinylidene cyanide, which interpolymers can be readily fast dyed in the conventional manner to produce colored filaments, films and shaped articles.

It has now been discovered that the above and other objects are readily accomplished by polymerizing vinylidene cyanide with a second monomer which, when polymerized alone with vinylidene cyanide, forms an essentially 1:1 alternating two-component copolymer therewith, selected from the group consisting of polymerizable monoolefins and aliphatic conjugated dienes, and a third monomer defined as an alpha,beta-disubstituted ethylene which has strong electron withdrawing groups. The interpolymers so prepared contain groups which are easier to react with basic groups such as amino than are the dinitrile or ester groups in known vinylidene cyanide copolymers. The interpolymers obtained by the practice of this invention differ markedly in properties from the two-component copolymers of vinylidene cyanide with monoolefinic compounds and are very valuable synthetic resins.

Preferred monoolefinic compounds which are polymerized with vinylidene cyanide in accordance with the present invention are characterized in that they are polymerizable unsaturated compounds wherein the carbon-to-carbon unsaturation consists in a terminal methylene ($CH_2$) joined by an ethylenic double bond to its adjacent carbon, that is, having a $CH_2=C<$ group.

Representative monoolefinic monomers which are preferred for the second monomer in this invention include: styrene, alpha-methyl styrene, isobutylene, alpha-chlorostyrene, vinyl chloride, vinylidene chloride, fluoroethylene, vinyl acetate, methyl methacrylate, isopropenyl acetate, vinyl alpha-chloroacetate.

Representative aliphatic conjugated dienes which may be used include: butadiene-1,3, 2-methyl butadiene-1,3, piperylene, 2,3-dimethyl butadiene-1,3, 2,2-dimethyl butadiene-1,3, 1,3-dimethyl butadiene-1,3, 1-ethyl butadiene-1,3, 1,4-dimethyl butadiene-1,3, 2-neopentyl butadiene-1,3, 2-methyl pentadiene-1,3, 2-chloro-butadiene-1,3, 2-bromo-butadiene-1,3, and the like.

Most preferred for the second monomer of this invention because of low cost and easy availability are styrene, vinyl chloride, vinylidene chloride, vinyl acetate and butadiene-1,3.

The third monomer used in the practice of this invention is selected on the basis of the fact that it will enter the vinylidene cyanide:comonomer:vinyliedene cyanide:comonomer chain during polymerization of the monomers and at the same time leave side groups pendant from the main polymer chain which will react readily with such basic groups as amino ($—NH_2$) which can in turn be made to react with acid dyes, thereby to readily produce dyed interpolymer filaments, fibers and films. Monomers containing an alpha,beta-disubstituted ethylene structure with the substituting chains bridged by oxygen as in the anhydride structure are especially preferred, although unbridged chains containing a carbonyl (CO) group are satisfactory. A more apt description of this group is to call it butenedioic acid derivatives. Such monomers are found to be further characterized by having high $e$ values as described in Price, C. C., "Journal of Polymer Science," volume 1, page 83, 1946 and Price, C. C., "Journal of Polymer Science," volume 3, page 772, 1948. In these monomers a high $e$ value is significant of strongly electron withdrawing groups in the compound under consideration. Preferred $e$ values range from about 1 to about 3.

Materials useful as third monomers in the practice of this invention therefore include maleic anhydride, 2-methyl maleic anhydride, 2-ethyl maleic anhydride, dimethyl maleate, diethyl maleate, dimethyl fumarate, diethyl fumarate, methylethyl maleate and methylethyl fumarate with maleic anhydride because of its low cost, ready availability, and high $e$ value of +2.67 being the most preferred.

It is disclosed in the U. S. patents referred to hereinabove that vinylidene cyanide polymerizes ionically in the presence of a number of substances which provide ions, for example, water, alcohols, esters, ketones and the like to form a homopolymer which is of low molecular weight (below 25,000) and of little or no practical value. In preparing the interpolymers of the present invention, therefore, care must be taken to prevent entirely or reduce to a minimum this ionic homopolymerization of vinylidene cyanide monomer. This is best accomplished by carrying out the polymerization in a completely organic medium, that is, in a single phase, since when the polymerization is carried out in a two phase or water emulsion system, the vinylidene cyanide polymerizes spontaneously by an ionic mechanism to form the low molecular weight homopolymer described hereinabove. It is also desirable that the polymerization be carried out in the presence of a very active free radical polymerization catalyst. In this manner the tendency for ionic homopolymerization of the vinylidene cyanide to occur is greatly repressed or eliminated altogether and high conversion of monomer to polymer are secured.

In the preferred manner of carrying out the polymerization of vinylidene cyanide with another monoolefinic monomer, and maleic anhydride or an aliphatic, conjugated diene and maleic anhydride, the monomers are first dissolved in a liquid aromatic hydrocarbon such as benzene, chlorobenzenes, toluene, methyl toluene, or the like, preferably in an amount such that the solvent comprises from 50 to 80 percent or more by weight of the total solution. A free radical polymerization catalyst is added to the solution and the resulting mixture heated to a temperature of from —15° C. to 100° C., preferably at 0° C. to 60° C., whereupon polymerization occurs to form the desired interpolymer as a white powder of small particle size, the polymerization requiring approximately ½ to 20 hours in most instances. The interpolymer thus formed may be separated from the polymerization medium simply by filtering, or if desired, the polymerization medium can be separated from the polymer and recovered by distillation.

A second method of polymerization, less desirable than the above method, but which may be utilized successfully, consists in agitating the monomers in a liquid aliphatic hydrocarbon (in which vinylidene cyanide monomer is only very slightly soluble), for example, hexane or heptane, and heating in the presence of a free radical polymerization catalyst whereupon the interpolymer forms and may be separated from the polymerization medium by filtering or removing the polymerization medium by distillation.

An alternative method of polymerization, especially convenient in the preparation of interpolymers of vinylidene cyanide wherein one or more of the components of said interpolymer is a vinyl ester of an alpihatic monocarboxylic acid such as vinyl acetate, consists in utilizing a relatively large excess of said vinyl ester as a polymerization medium for the other monomers. By carrying out the polymerization in this manner it is not necessary to employ other liquid substances as the polymerization medium.

The polymerization may also be carried out on a continuous basis simply by adding, continuously or intermittently, fresh quantities of the monomers, and also of catalyst and solvent or diluent, if desired, to the polymerization mixture during the course of the polymerization.

The catalysts utilized in preparing the interpolymers of the present invention are those which form free radicals at the polymerization temperature, and particularly those which are very active free radical type materials, since it is desirable that the polymerization proceed as rapidly as possible in order that the ionic homopolymerization of the vinylidene cyanide can not occur in an appreciable amount. Particularly useful catalysts of this type include the combination of sulfur dioxide with an organic mercaptan as disclosed in copending application, Serial No. 346,041, filed March 31, 1953 or the combination of an inorganic acid with an organic thiol (mercaptan) such as methanethiol, 1-butanethiol, toluene-thiol and the like, the latter catalyst combination being disclosed in another copending application, Serial No. 346,042, filed March 31, 1953.

A second useful class of catalysts comprises compounds of the structure

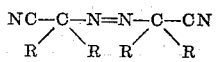

wherein each R is a hydrocarbon radical. Examples of compounds of this class include alpha,alpha'-azodiisobutyronitrile, alpha,alpha - azobis(alpha,beta - dimethylbutyronitrile), alpha-alpha' - azobis(alpha - cylopropionitrile), and the like. The use of this type of catalysts in preparing polymers of vinylidene cyanide is disclosed in copending application, Serial No. 288,562, filed May 17, 1952.

Other catalysts which are useful in the polymerization include the peroxygen compounds such as benzoyl peroxide, caproyl peroxide, lauroyl peroxide, acetone peroxide, acetyl benzoyl peroxide, cumene hydroperoxide, o,o'-dichlorobenzoyl peroxide, o,o'-dibromobenzoyl peroxide, caprylyl peroxide, pelargonyl peroxide, tertiary butyl hydroperoxide, tetralin peroxide, and the like.

The quantity of catalyst utilized is not critical and may be varied widely. In general, however, from 0.01 to 5 percent by weight of the catalyst (based on the total weight of monomers charged) of the catalyst is utilized, although smaller or larger amounts may be employed if desired.

Once the desired interpolymers have been prepared, they are washed in a non-solvent hydrocarbon such as benzene, dried, and then dissolved in a spinning dope solvent such as a mixture of nitromethane and dimethyl formamide. The dope is forced through a spinnerette, the coagulated fibers being collected in air or in an appropriate bath solution. The fibers are next immersed in a water solution of a compound selected from the group consisting of amines and amino alcohols to provide points of attachment on the polymer chain for the acid dyes.

Amines and amino alcohols useful in this step of the invention include among others ethylene diamine, N,N-dimethylpropylene diamine, N,N-diethylpropylene diamine, triethylene tetramine, tetraethylene pentamine, methyl, ethyl and propyl amines, ethanolamine, N,N-dimethyl ethanolamine, and N,N-diethyl propanolamine.

After the amine treatment the interpolymer fibers are dyed in standard wool dye baths to give uniformly dyed fibers which can be processed into yarns, cords, twills, and other fabrics along or blended with other dyed materials such as wool.

The following examples illustrate more fully the preparation, treating, and dyeing of interpolymers of vinylidene cyanide, a monoolefin, and a disubstituted ethylene of strong electron withdrawing powers and a high $e$ value, and interpolymers of vinylidene cyanide, an aliphatic conjugated diene, and a disubstituted ethylene of strong electron withdrawing powers and a high $e$ value.

The examples are not, however, to be construed as a limitation upon the scope of the invention, for there are, of course, numerous possible variations and modifications in the procedures described. In the examples all parts are by weight.

*Example 1*

Tripolymers of vinylidene cyanide, maleic anhydride, and one other monoolefinic monomer which, when copolymerized alone with vinylidene cyanide, form essentially 1:1 alternating copolymers, were made by sealing monomers, catalyst, and sometimes a solvent in polymerization vessels which were held at 45° C. in a water bath for varying periods of time. Solid polymer was filtered off, washed in benzene, then in water, and dried. Data is given in the table below:

| Run No. | 1 | 2 | 3 | 4 | 5 | 6 (control) |
|---|---|---|---|---|---|---|
| Material: | | | | | | |
| Vinylidene cyanide, grams | 0.85 | 0.85 | 3.0 | 15.0 | 0.7 | 3.0 |
| Maleic anhydride, grams | 1.0 | 2.0 | 2.0 | 3.0 | 2.64 | 2.0 |
| Vinyl acetate, grams | 6.2 | 6.2 | | | | |
| Vinylidene chloride, grams | | | 15.0 | | | |
| Styrene, grams | | | | 25.0 | | |
| Butadiene, grams | | | | | 1.95 | |
| 2,4-dichlorobenzoyl peroxide, grams | 0.03 | 0.03 | 0.015 | 2.15 | | 0.015 |
| Cumene hydroperoxide, grams | | | | | 0.3 | |
| Benzene, grams | | | 13.2 | 993.0 | 40.0 | 13.2 |
| Polymerization time, hours | 2.75 | 3.75 | 46.0 | 4.5 | 12.0 | 46.0 |
| Terpolymer yield | 1.89 | 2.73 | 6.49 | 35.8 | 3.87 | zero |

In runs 1 and 2 the maximum possible yield, if no maleic anhydride enters the polymer chain, is 1.79 grams. In run 3, 13.87% nitrogen was found, whereas, if no maleic anhydride had entered the polymer chain, a theoretical 16.0 percent would have been found. In run 4, 15.06 weight percent nitrogen was found, whereas; if no maleic anhydride units were in the polymer chain, 15.38 weight percent nitrogen are theoretically present. In run 5, the weight percent nitrogen found was 6.1 whereas the theoretical amount, if no maleic anhydride were in the polymer chain is 21 percent. This example shows that interpolymers of the three monomers involved were formed in every case. The need for at least three monomers is indicated by control run No. 6 wherein vinylidene cyanide and maleic anhydride were copolymerized, but no polymer was produced. This is expected from the teachings of Price, C. C., above, which show that two high $e$ value monomers would not be expected to copolymerize. In the terpolymers, the third monomer, styrene, vinylidene chloride, vinyl acetate, and butadiene all have low $e$ values and the combination of high and low $e$ value monomers enables the polymerizations of the example to take place. These low $e$ values range from $-0.8$ to $+0.6$.

*Example 2*

7.7 grams of vinylidene cyanide, 93.2 grams of vinyl acetate, 4.5 grams of maleic anhydride and 1.8 grams of 2,4-dichlorobenzoyl peroxide catalyst were sealed in a polymerization bottle and tumbled 3.1 hours in a 45° C. water bath. The 18.46 grams of polymer produced were washed three times in benzene and dried at 60° C. Calculated on the basis of alternating polymers, if no maleic anhydride entered the product, yield would be 16.14 grams, and if all the maleic anhydride had entered the product, yield would be 24.59 grams.

6 grams of the terpolymer produced were rolled in 33.9 grams of nitromethane and 4.7 grams of dimethyl formamide for 12 hours at room temperature to produce a spinning dope which was fed through a spinnerette, the fibers being collected in air. The as spun yarn produced had the following properties:

.78 g./denier tenacity
5% elongation

Half of the yarn was immersed in a water solution of dimethyl ethanolamine for 1 hour at room temperature. After a rinse in cold water, the yarn was placed in a test tube containing 2% Alizarin Sky Blue dye, and 15% sodium bisulfate on weight of fabric (o. w. f.). The tube was held in a boiling water bath for one hour. After dyeing, the yarn was rinsed in cold water and half of the dyed yarn was scoured twice for 3 minutes in water containing an alkaline detergent solution of pH 12. The entire sample exhibited a uniform blue shade after dyeing and the scoured portion showed only a slight loss in color.

The remaining half of the yarn was made up into cords approximately 110–140 milligrams in weight. The cords were shaken for 2 hours in various amine and amino alcohol water solutions as indicated in the table below:

| (1a) 2 ml. crude N,N-dimethyl ethanolamine<br>8 ml. water | (1b) 2 ml. crude N,N-dimethyl ethanolamine<br>6 ml. water<br>2 ml. acetone |
| --- | --- |
| (2a) 2 ml. crude ethanolamine<br>8 ml. water | (2b) 2 ml. crude ethanolamine<br>6 ml. water<br>2 ml. acetone |
| (3a) 2 ml. crude triethylene tetramine<br>8 ml. water | (3b) 2 ml. crude triethylene tetramine<br>6 ml. water<br>2 ml. acetone |
| (4a) 2 ml. N,N-diethylpropylene diamine<br>8 ml. water | (4b) 2 ml. N,N-diethylpropylene diamine<br>6 ml. water<br>2 ml. acetone |

The cords were next washed in cold water, then immersed in cold water for one hour, after which they were dried at 65° C. for 50 minutes. The dried fibers were stiffer than the original yarn. The (b) series, employing acetone, was slightly more brittle than the (a) series.

The following dye bath was made up:

.021 g. Alizarin Sky Blue
.30 g. NaHSO$_4$
.40 g. Na$_2$SO$_4$ (anhydrous)

The bath contained 2% dye, 15% sodium bisulfate and 20% sodium sulfate on weight of fabric. The dye bath ratio was 1 gram of fiber to 40 grams of dye liquor. Next the cords were placed in the cold dye bath, each in its own small test tube. The tubes were then held one hour in a boiling water bath. Following this, the dyed cords were rinsed in cold water and air dried.

Samples (4a) and (4b) showed greatest ease of dyeability, exhausting the dye bath (removing all color from it) in 10 minutes. All other samples exhausted their baths by the end of the hour treatment. All sample cords dyed uniformly through their entire lengths. (3a) and (3b) showed the deepest blue; (1a), (1b), (2a), (2b), (4a) and (4b) showed about the same depth of blue.

The dyed cords were given two successive 4 minute scours in boiling water containing alkaline detergent solution of pH 12. The first scour did not remove any significant amount of dye. The second scour lightened sample (1b) but did not noticeably lighten the color of the others.

Next the cords were disentangled and single filaments were evaulated on the Instron tensile testing machine with these results:

| Untreated yarn | 11.8 average denier | 0.74 g./d. tenacity. |
| --- | --- | --- |
| Series: | | |
| (1a) | 13.1 average denier | 0.71 g./d. tenacity. |
| (1b) | 12.8 average denier | 0.74 g./d. tenacity. |
| (2a) | 11.9 average denier | 0.79 g./d. tenacity. |
| (2b) | 12.4 average denier | 0.87 g./d. tenacity. |
| (3a) | 12.8 average denier | 0.82 g./d. tenacity. |
| (3b) | 12.4 average denier | 0.81 g./d. tenacity. |
| (4a) | 12.7 average denier | 0.71 g./d. tenacity. |
| (4b) | 12.7 average denier | 0.74 g./d. tenacity. |

*Example 3*

7.7 grams of vinylidene cyanide, 74.5 grams of vinyl acetate, 2.0 grams of maleic anhydride and 1.68 grams of 2,4-dichlorobenzoyl peroxide were sealed in a polymerization bottle and tumbled three hours in a 45° C. water bath. The 17.94 grams of product were washed three times with benzene and dried at 65° C. Calculated on the basis of alternating polymers, if no maleic anhydride entered the product, the yield would be 16.16 grams, and if all the maleic anhydride entered the product, the yield would be 19.92 grams.

6 grams of the terpolymer were rolled in 28.3 grams of nitromethane and 4.7 grams of dimethyl formamide to produce a clear spinning dope dispersion. When fed through a spinnerette and collected in air, a white, shiny yarn was produced.

The yarn filaments were shaken in a 20% by volume water solution of tetraethylene pentamine for 2 hours at room temperature, then washed in cold water. Three dye solutions were made to this recipe:

1.8 grams NaHSO$_4$ — To each of three 40 ml.
2.4 grams Na$_2$SO$_4$ (anhydrous) — portions of this solution was added
480 grams water — 0.02 gram of dyestuff The three dyes were A (Alizarin Sky Blue), B (Alizarin Sky Blue, and C (Crocein Scarlet N).

The dye bath ratio was 1 gram fiber to 40 grams dye solution, and the bath contained 2% dyestuff, 15% NaHSO$_4$ and 20% Na$_2$SO$_4$ on weight of fabric. 0.4 gram of terpolymer and 0.45 gram of wool were union dyed in bath A, being held 1 hour at boil, then scoured 5 minutes at boil in water containing alkaline detergent solution of pH=12. The synthetic fiber dyed to a lighter shade than the wool, but both fibers dyed uniformly and could be blended easily.

0.83 gram of terpolymer were dyed in bath B, being held 1 hour at boil and scoured 5 minutes at boil in water containing alkaline detergent solution of pH=12. The fiber readily accepted the dye.

*Example 4*

The second half of the as spun yard of Example 3 was tested as follows for dyeing comparison to wool. Alizarin Sky Blue dyestuff was prepared in a dye solution containing 0.02 gram of dyestuff and 40 ml. of a solution containing 1.8 grams NaHSO$_4$, 2.4 grams Na$_2$SO$_4$ and 480 grams of water. In the dye bath, a ratio of 1 gram of fiber to 40 grams of dye solution was used. Duplicate samples were kept in the dye baths for 1 hour at the temperature of a boiling water bath; then half of the samples were dried and the second half were scoured 5 minutes at boil in alkaline detergent solution of pH=12 before drying. Data is listed in the table below:

| Material | Weight of Material (grams) | Appearance after Dyeing | |
| --- | --- | --- | --- |
| | | Unscoured | Scoured |
| Vinylidene cyanide, vinyl acetate, maleic anhydride terpolymer.<br>+wool | 0.182 terpolymer.<br>0.195 virgin wool. | Uniform deep blue.<br>do | Uniform deep blue.<br>Uniform light blue. |

The synthetic terpolymer held the dye much better under the alkaline scour than wool did.

*Example 5*

23 grams of vinylidene cyanide, 279 grams of vinyl acetate, 13.5 grams of maleic anhydride, 0.54 gram of 2,4-dichlorobenzoyl peroxide and 90 grams of benzene were placed in a sealed bottle polymerizer which was rotated 5 hours in a 44° C. water bath. After filtration, washing and drying 66.8 grams of terpolymer had been obtained.

6.5 grams of the polymer, 33.1 grams of nitromethane, and 3.3 grams of dimethyl formamide were rolled overnight to form a spinning dope which was then run through a spinnerette, the fibers being collected in air. A lustrous, white yarn was obtained whose properties were:

As spun tenacity 0.71 g./d.
Elongation 12%

The as spun yarn was divided into six portions which were subjected to six different basic treatments:

1. No treatment (control)
2. 2 minutes at 96° C. in 19.8 weight percent ethylene diamine in water 3. 1 minute at 96° C. in 19.8 weight percent ethylene diamine in water
4. ½ minute at 96° C. in 19.8 weight percent ethylene diamine in water
5. 2 hours at room temperature in 19.8 weight percent ethylene diamine in water
6. 20 minutes in pure ethylene diamine The treated samples were each divided in half, and one set was dyed at 1% level of Alizarin Sky Blue and the second set at 3% level of Alizarin Sky Blue. Both dye baths were used at the concentration of 1 gram of yarn to 40 grams of dye solution. As in previous examples, each yarn sample was placed in the dye bath in a test tube and the tube was held in a boiling water bath for 1 hour. All samples were scoured 15 minutes in boiling alkaline detergent water solution of pH=12 after dyeing.

Examination of the samples showed that all lightened somewhat after scouring, but there was no essential difference as a result of the five different amine treatments. The control non-treated sample lost nearly all of its color in the scouring.

The results of this example indicate that some treatment with a water solution of an amine is needed to obtain color that will resist an alkaline scour. The treatment can be as short as ½ minute in 19.8% ethylene diamine at 96° C. or as long as 2 hours in the same solution at room temperature. Use of pure amine is of no advantage.

*Example 6*

Yarn from the polymer of Example 3 was processed to a twill construction, which was immersed in 4.5 grams of ethylene diamine in 36 grams of acetone for 2 minutes at room temperature, followed by a 3 minute rinse in cold water. Inch square pieces were dyed in 2% Alizarin Sky Blue dye baths (one gram twill to 40 grams dye solution) for one hour at boil in a water bath. The samples dyed uniformly. A 15 minute scour at boil in alkaline detergent solution of pH=12 did not remove a significant amount of dye. Further twill samples were successfully union dyed with wool in similar baths and with the same scour.

Pieces of the terpolymer twill aged one month after the amine treatment also dyed perfectly, indicating that treated materials can be held for some time after treatment before final dyeing. This could be an advantage in commercial practice.

*Example 7*

More synthetic twill samples of Example 6 were treated by the same procedure with ethyl amine in place of ethylene diamine; again the dyeing was excellent.

As shown in the examples the polymerization of a minor amount of maleic anhydride with vinyl acetate and vinylidene cyanide under polymerization conditions that avoid formation of low molecular weight polyvinylidene cyanide forms a terpolymer which is easily treated with a water solution of a member of the group comprised of amines and amino alcohols which enables amino groups to be fastened to the polymer chain. The treated synthetic terpolymers show excellent affinity for acid dyes and retain color well even under severe alkaline scourings.

The preferred alpha,beta-disubstituted ethylenes are butenedioic acid derivatives including maleic anhydride, and the methyl and ethyl esters of maleic and fumaric acids with e values of from about 1 to about 3.

Although specific examples of the invention have been herein described, it is not intended to limit the invention solely thereto, but to include all of the variations and modifications falling within the spirit and scope of the appended claims.

I claim:
1. A resinous interpolymer of (1) monomeric vinylidene cyanide, (2) maleic anhydride, and (3) a monomer containing a $CH_2=C<$ group, and which, when polymerized alone with vinylidene cyanide, forms essentially a 1:1 alternating two-component copolymer therewith said interpolymer resulting from the polymerization in a single phase system of a monomeric mixture comprising from 2.8% to 15.6% by weight of (1) and from 95.2% to 84.4% by weight of (2) and (3) combined, with (2) being present in the amount of 2.4% to 48.6% by weight of the mixture.

2. A resinous interpolymer of (1) monomeric vinylidene cyanide, (2) maleic anhydride, and (3) a monomer containing a $CH_2=C<$ group, and which, when polymerized alone with vinylidene cyanide, forms essentially a 1:1 alternating two-component copolymer therewith selected from the class consisting of vinyl acetate, styrene, butadiene, and vinylidene chloride, said interpolymer resulting from the polymerization in a single phase system of a monomeric mixture comprising from 2.8% to 15.6% by weight of (1) and from 95.2% to 84.4% by weight of (2) and (3) combined, with (2) being present in the amount of 2.4% to 48.6% by weight of the mixture.

3. A resinous interpolymer of (1) monomeric vinylidene cyanide, (2) maleic anhydride, and (3) vinyl acetate, said interpolymer resulting from the polymerization in a single phase system of a monomeric mixture comprising from 7.3% to 10.6% by weight of (1) and from 92.7% to 89.4% by weight of (2) and (3) combined, with (2) being present in the amount of 2.4% to 22.0% by weight of the mixture.

4. A resinous interpolymer of (1) monomeric vinylidene cyanide, (2) maleic anhydride, and (3) styrene, said interpolymer resulting from the polymerization in a single phase system of a monomeric mixture comprising 2.8% of (1), 10.5% of (2) and 86.7% of (3) by weight.

5. A resinous interpolymer of (1) monomeric vinylidene cyanide, (2) maleic anhydride, and (3) butadiene, said interpolymer resulting from the polymerization in a single phase system of a monomeric mixture comprising 15.6% of (1), 48.6% of (2) and 35.8% of (3) by weight.

6. A resinous interpolymer of (1) monomeric vinylidene cyanide, (2) maleic anhydride, and (3) vinylidene chloride, said interpolymer resulting from the polymerization in a single phase system of a monomeric mixture comprising 4.8% of (1), 11.2% of (2) and 84% of (3) by weight.

7. The method which comprises admixing (1) vinylidene cyanide, (2) maleic anhydride, and (3) a monomer containing a $CH_2=C<$ group and which, when polymerized alone with vinylidene cyanide, forms essentially a 1:1 alternating two-component copolymer therewith to form a single phase system, and adding a free radical polymerization catalyst, whereupon polymerization occurs to form an interpolymer, said monomers being charged in the amounts of from 2.8% to 15.6% by weight of (1) and from 95.2% to 84.4% by weight of (2) and (3) combined, with (2) being present in the amount of 2.4% to 48.6% by weight of the monomer mixture.

8. The method which comprises admixing (1) vinylidene cyanide, (2) maleic anhydride, and (3) a monomer containing a $CH_2=C<$ group and which, when polymerized alone with vinylidene cyanide, forms essentially a 1:1 alternating two-component copolymer therewith, selected from the class consisting of vinyl acetate, styrene, butadiene, and vinylidene chloride, to form a single phase system, and adding a free radical polymerization catalyst, whereupon polymerization occurs to form an interpolymer, said monomers being charged in the amounts of from 2.8% to 15.6% by weight of (1) and from 95.2% to 84.4% of (2) and (3) combined, with (2) being present in the amount of 2.4% to 48.6% by weight of the monomer mixture.

9. The method which comprises dissolving in a liquid aromatic hydrocarbon (1) vinylidene cyanide, (2) maleic anhydride, and (3) a monomer containing a $CH_2=C<$ group and which, when polymerized alone with vinylidene cyanide, forms essentially a 1:1 alternating two-component copolymer therewith, selected from the class consisting of vinyl acetate, styrene, butadiene, and vinylidene chloride, to form a single phase system, and adding a free radical polymerization catalyst, whereupon polymerization occurs to form an interpolymer, said monomers being charged in the amounts of from 2.8% to 15.6% by weight of (1) and from 95.2% to 84.4% by weight of (2) and (3) combined, with (2) being present in the amount of 2.4% to 48.6% by weight of the monomer mixture.

References Cited in the file of this patent

UNITED STATES PATENTS

| | | |
|---|---|---|
| 2,650,911 | Gilbert et al. | Sept. 1, 1953 |
| 2,657,197 | Carlson | Oct. 27, 1953 |
| 2,734,888 | D'Alelio | Feb. 14, 1956 |

OTHER REFERENCES

Price: J. Pol. Sci., vol. 3 (1948), pages 772–775.